United States Patent [19]

Ladin

[11] Patent Number: 4,534,458
[45] Date of Patent: Aug. 13, 1985

[54] SELF-ALIGNING CLUTCH RELEASE BEARING ASSEMBLY

[75] Inventor: Eli M. Ladin, Ann Arbor, Mich.

[73] Assignee: Federal-Mogul Corporation, Southfield, Mich.

[21] Appl. No.: 342,255

[22] Filed: Jan. 25, 1982

[51] Int. Cl.³ .............................................. F16D 23/14
[52] U.S. Cl. .................................... 192/98; 192/110 B
[58] Field of Search .............. 192/98, 110 B; 308/233, 308/184 A

[56] References Cited

U.S. PATENT DOCUMENTS

| | | | |
|---|---|---|---|
| 3,365,040 | 1/1968 | Pitner | 192/98 |
| 3,815,715 | 6/1974 | Maucher | 192/98 |
| 3,877,557 | 4/1975 | Maucher | 192/98 |
| 3,913,714 | 10/1975 | Camp | 192/110 B X |
| 4,033,440 | 7/1977 | Ladin | 192/98 |
| 4,117,917 | 10/1978 | Ladin et al. | 192/98 |
| 4,143,748 | 3/1979 | Maucher | 192/98 |
| 4,219,246 | 8/1980 | Ladin | 192/98 X |
| 4,276,974 | 7/1981 | Ladin | 192/98 |
| 4,428,472 | 1/1984 | Olschewski et al. | 192/110 B X |

Primary Examiner—Rodney H. Bonck
Attorney, Agent, or Firm—Robert F. Hess

[57] ABSTRACT

A self-aligning clutch release bearing assembly is described which is particularly well suited for use in a rotatable friction clutch of the type where the clutch release levers constantly engage the rotatable race member of the bearing. The bearing is formed to provide a predetermined radial clearance between the bearing and the bearing carrier for permitting the bearing to shift radially with respect to the bearing carrier, so that the bearing may coaxially align itself with the clutch input shaft axis under a force imparted to the bearing by the rotating clutch release levers.

3 Claims, 3 Drawing Figures

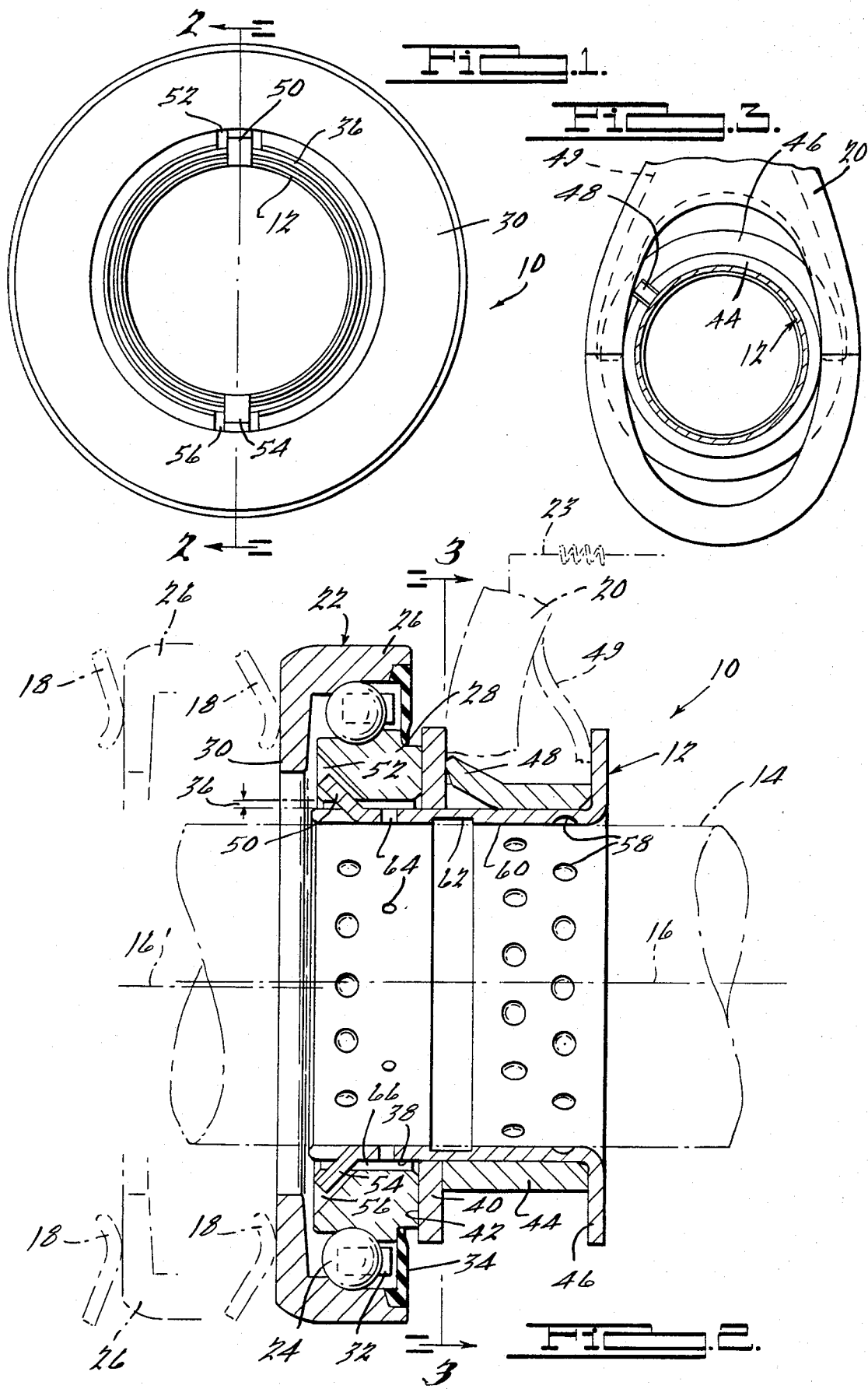

SELF-ALIGNING CLUTCH RELEASE BEARING ASSEMBLY

BACKGROUND AND SUMMARY OF THE INVENTION

The present invention relates generally to bearing assemblies, and particularly to self-aligning clutch release bearing assemblies in automobile friction disc clutches.

A common problem in typical automobile friction disc clutches arises from a misalignment or eccentricity between the engine crankshaft or clutch input shaft axis and the transmission shaft axis. With clutch release bearings having a fixed axis of rotation, this eccentricity subjects the clutch release bearing to chafing and vibration when engaged by the clutch release fingers or levers to actuate, i.e. disengage, the clutch. It has been common for the release bearing to be engaged only during clutch actuation by the vehicle operator. However, in some applications it has been found desirable to have the bearing engaged continuously and hence to be lightly or more forcefully engaged by the clutch release fingers depending upon whether the clutch is actuated or not. In this situation the problems of chafing, etc., due to eccentricity are even more aggravated since the rotatable race member of the clutch release bearing will always be rotating while the engine is running.

The present invention provides a novel clutch release bearing assembly, which is self-aligning and has special utility with the constantly engaged clutch bearing design. With prior self-aligning bearings some type of retaining spring or mechanical retaining structure is used to hold the bearing in the aligned position when the clutch is engaged. In the present invention, no such device is used and if the bearing were disengaged from the clutch release fingers it would move out of the aligned position. The present invention, however, converts the otherwise undesirable effects of the constantly engaged clutch bearing design into a valuable asset for aligning and maintaining alignment of the clutch release bearing with the input shaft axis of the clutch without the need for a retaining spring or mechanical structure. Accordingly, it is an object of the present invention to provide a self-aligning clutch release bearing for use with a constantly engaged clutch bearing design, which is of simple design, durable in operation, and which is of economical manufacture.

With prior self-aligning bearing assemblies the retaining spring inhibits rotation of the bearing assembly. In the present invention, where a retaining spring is not utilized a simple interlocking tab and slot structure is used to prevent rotation and at the same time to provide a means for holding the components of the self-aligning bearing assembly in an assembled relationship. Thus it is another object of the present invention to provide a novel self-aligning bearing assembly having a unique anti-rotation construction.

In the present invention the bearing is constructed to provide a predetermined annular radial clearance between the inner race of the bearing and an axially extending surface of a bearing carrier or support for permitting the bearing to shift radially with respect to the bearing carrier, such that the bearing axis can be aligned with the input shaft axis. This radial shifting occurs automatically in response to the radial chafing force exerted by the rotating clutch release fingers which will force the bearing to shift radially and assume the dynamic axis of the input (flywheel) shaft of the clutch. It will be appreciated that a number of transient forces may act upon the bearing assembly to cause temporary misalignments of the bearing axis with the clutch input axis. Accordingly, the alignment of the bearing axis with the clutch input axis will typically not be static, but rather dynamic in character. However, as long as the clutch release levers are rotating, the constant engagement of these levers with the bearing will continuously provide the force required to dynamically maintain the bearing in alignment with the clutch input axis.

Additional features and advantages of the invention will become apparent in view of the drawings and the following detailed description of the preferred embodiment.

BRIEF DESCRIPTION OF THE DRAWINGS

FIG. 1 is a front elevation view of a self-aligning clutch release bearing in accordance with the present invention; and FIG. 2 is a cross-sectional view of the clutch release bearing assembly shown in an assembled relationship with a clutch assembly shown partially in phantom, the section being taken along 2—2 of FIG. 1.

FIG. 3 is a cross-sectional view taken of the clutch release bearing assembly shown in FIG. 2 illustrating the interaction of the clutch actuating fork with an anti-rotation means of the bearing assembly, the section being taken along 3—3 of FIG. 2.

DETAILED DESCRIPTION OF THE PREFERRED EMBODIMENT

Referring to FIGS. 1 and 2, a self-aligning clutch release bearing assembly 10 in accordance with the present invention is shown, and is adapted for use with a conventional clutch assembly, the details of which have been omitted for simplicity. Bearing assembly 10 includes a tubular bearing carrier 12 adapted to be slidably mounted on a guide member or quill 14 shown in phantom. The guide member 14 may typically comprise a tubular support affixed to and projecting forwardly of a transmission (not shown) through which the transmission shaft extends. Under ideal conditions guide member 14 is disposed with its axis 16 substantially coaxial with an input axis of rotation 16' for the clutch assembly. However, often the axis 16 of guide member 14 will be slightly out of alignment or eccentric with respect to the rotational axis 16' such as shown in the drawings. The clutch assembly includes clutch release lever means 18 (partially shown in phantom) which rotate about axis 16'. A clutch actuating fork means 20 (partially shown in phantom) straddles bearing carrier 12 and is actuable to axially move the clutch release bearing assembly 10. A further description of a typical friction disc clutch may be found in assignee's U.S. Pat. No. 4,033,440 issued July 5, 1977, entitled "Self-Aligning Clutch Bearing Assembly," the disclosure of which is hereby incorporated by reference.

As is well understood in the art, actuation of the clutch occurs through pivotal movement of the fingers 18 as imparted thereto through the fork 20 via the clutch bearing 10. This actuation will force bearing assembly 10 to slide along bearing carrier 12 from a first position wherein the clutch is in an engaged condition for coupling power from the engine to the transmission, to a second position (shown in phantom) wherein the clutch is in a disengaged position for uncoupling power.

With prior designs, it has been common for the release bearing to be engaged with the fingers 18 only during clutch actuation. However, the present invention is specifically designed for use with a clutch constructed such that the bearing assembly 10 is continuously engaged by the fingers or levers 18. In this clutch design, the actuating fork 20 may typically be spring loaded via a spring 23 (shown in phantom) such as to normally urge the bearing assembly 10 into a continuous light contact with the clutch release levers 18 when the clutch is in the engaged condition. As can be seen, the contact continues when the clutch pedal is depressed to disengage the clutch. This continuous contact with the clutch engaged or disengaged is shown as solid and phantom lines, respectively in FIG. 1. As previously noted without the bias from the fork 20, the bearing assembly 10 would move out of alignment each time the clutch pedal is released and the clutch is in the engaged condition.

Accordingly, bearing assembly 10 includes a bearing 22 which is adapted to be in constant engagement with clutch release levers 18. Bearing 22 generally comprises a plurality of anti-friction ball elements 24 interposed between an outer race member 26 and an inner race member 28. The bearing 22 is of the type capable of withstanding axial thrust loads imposed thereon. Outer race member 26 is adapted for rotation and includes an annular radially extending contact surface 30 positioned so as to engage the clutch release levers 18. A cage 32 circumferentially spaces balls 24, while a resilient elastomeric annular seal element 34 is secured to outer race member 26.

Bearing 22 is disposed substantially coaxially around bearing carrier 12 between clutch release levers 18 and clutch actuating fork 20, and is formed to provide a predetermined annular radial clearance 36 between the inner race member 28 and a generally axially extending surface 38 of the bearing carrier 12. The radial clearance 36 permits bearing 22 to shift sufficiently radially with respect to bearing carrier surface 38 and axis 16, whereby the bearing 22 may coaxially align itself with the clutch input shaft axis 16' under the dynamic force exerted on the bearing 22 by the engaged clutch release levers 18. After the bearing 22 is coaxially aligned with the input shaft axis 16', the continuous or constant engagement of the clutch release levers 18 with the radially extending contact surface 30 of the rotatable race member 26 will tend to hold the bearing 22 in this desired radial attitude even when the clutch is not being actuated to its disengaged position (the disengaged position being shown in phantom in FIG. 2).

It should be understood that the alignment of the bearing 22 with the clutch input shaft axis 16' is dynamic in character and a number of transient forces may act upon the bearing assembly to cause temporary misalignments. For example, vibration or shock loading may cause the bearing 22 to slip slightly out of alignment. Additionally, misalignment may occur during the translational movement of the bearing assembly 10 along the guide member 14, such as when the clutch pedal is manually depressed or released. Depending upon how closely the bearing carrier 12 is fitted over the guide member 14, the pivotal movement of the actuating fork 20 during clutch actuation may cause the bearing carrier 12 to move in such a manner as to result in a momentary misalignment between the bearing 22 and the clutch input axis 16'. Nevertheless, the engagement between the rotating clutch release levers 18 and the bearing 22 will provide the force required for the bearing 22 to readily re-align itself with the clutch input axis 16'.

A radially extending thrust washer 40 is coaxially supported with a close fit on the axially extending bearing carrier surface 38 adjacent to and engaging the non-rotatable inner race member 28 of the bearing 22. Thrust washer 40 is used to maintain bearing 22 in a generally vertical attitude with respect to axis 16 and provides a bearing surface 42 against which the inner race member 28 may readily slide when bearing 22 shifts radially to align itself with the clutch input shaft axis 16'. However, it should be understood that this function may alternatively be provided by suitably shaping actuating fork 20. A tubular collar 44 is positioned in a press fit relationship with surface 38 of the bearing carrier 12 between the thrust washer 40 and a radially projecting flange portion 46 of the bearing carrier 12. Collar 44 serves to axially position bearing 22 and thrust washer 40 along the bearing carrier 12.

It is desirable to prevent rotation of the inner race member 28 and, for that matter, of the bearing assembly 10 itself. To this end the bearing assembly 10 is provided with means for preventing the rotation of the bearing carrier 12 and the inner race member 28 of the bearing 22. This anti-rotation means includes a generally radially outwardly projecting tab 48 formed in the collar 44 for co-acting or interlocking with the clutch actuating fork 20 to limit the rotation of the bearing carrier 12. This interaction may be visualized with reference to FIG. 3. The actuating fork 20 while straddling the bearing assembly 10 may have a cantilever spring member 49 which places a bias between the fork 20 and washer 40 and spring member 49 and flange portion 46 to thereby provide a limited resistance against rotational movement of the collar 44 and hence the bearing carrier 12. However, it is preferable that a positive stop be used and this is provided by the tab 48 which is disposed between the jaws of the actuating fork 20 for more positively limiting the extent of the rotation of the collar 44. Accordingly, should the collar 44 rotate against the resistance of the actuating fork 20 and the spring member 49, the tab 50 will engage one of the actuating fork jaws, whereby further rotational movement is prevented or blocked.

The anti-rotation means further includes at least one radially outwardly projecting tab 50 formed in the bearing carrier 12, and at least one notch 52 formed in the inner race member 28 for receiving the bearing carrier tab 50. Since the rotation of the bearing carrier 12 is prevented as described above, the bearing carrier tab 50 and the inner race member notch 52 cooperate or interlock to prevent the rotation of the inner race member 28. It should be noted that bearing carrier tab 50 also serves to hold bearing 22 in an assembled relationship with bearing carrier 12, and prevents the bearing 22 from separating or slipping off the bearing carrier during assembly onto the quill 14. In one form of the present invention an additional bearing carrier tab 54 and stationary race member notch 56 are provided, and are preferably disposed diametrically from tab 50 and notch 52, respectively. It should be understood that the particular shape of the tabs and the complementary notches may be suitably varied in the appropriate application. However, sufficient clearance should be provided between the tabs and notches so as to avoid interference with the radial shifting movement of self-alignment.

Bearing carrier 12 is also formed with a plurality of radially outwardly projecting indentations 58 disposed circumferentially about an interior axially extending bearing carrier surface 60 for providing pockets between the bearing carrier and the guide member or quill 14. The indentations 58 can be filled with a suitable lubricant for lubricating the reciprocable axial movement of the bearing assembly 10 along the guide member 14 during actuation and deactuation of the associated clutch. For the same purpose, bearing carrier 12 is further formed with an annular groove 62 for holding a supply of lubricant. Bearing carrier 12 is additionally formed with a plurality of radially extending passageways 64, which are communicable with the annular volume defined by the predetermined radial clearance 36. The radial clearance 36 also contains a supply of the lubricant, and forms a lubricant reservoir 66 for further assisting the reciprocable movement of the bearing assembly 10. The lubricant reservoir feature of the present invention is described in detail in my copending U.S. patent application, Ser. No. 330,130, filed Dec. 14, 1981 entitled "A Self-Aligning Clutch Release Bearing Assembly With Lubrication Reservoir," the disclosure of which is herein incorporated by reference.

It should be understood that various changes and modifications may be made to the preferred embodiment without departing from the spirit and scope of the invention as defined by the appended claims.

What is claimed is:

1. An improved self-aligning clutch release bearing assembly for a friction clutch in a vehicle power train having clutch release lever means rotatable about an input shaft axis of said clutch, a guide member disposed generally coaxially around a transmission shaft axis of said power train, and having an actuating means, said assembly comprising:

a tubular bearing carrier slidably mounted on said guide member for reciprocable, translational movement therealong in response to actuation of said actuating means, at least a portion of said bearing carrier being disposed radially between said guide member and said actuating means;

a bearing including a plurality of anti-friction elements interposed between radially spaced inner and outer race members, one of said race members being adapted for rotation and having an annular radially extending bearing surface for engaging said clutch release lever means;

said bearing being disposed substantially coaxially around said bearing carrier between said clutch release lever means and said actuating means and formed to provide a predetermined radial clearance between said bearing and an axially extending surface of said bearing carrier for permitting said bearing to shift radially with respect to said bearing carrier, so that said bearing may coaxially align itself with said clutch input axis under a dynamic force exerted on said bearing by said clutch release lever means, said actuating means being continuously biased to urge said bearing axially toward said clutch release lever means and to hold said bearing surface in constant engagement with said clutch release lever means; and anti-rotation means, including at least two circumferentially spaced generally radially outwardly extending projections provided on said bearing carrier and at least two generally radially outwardly extending notches in said other race member for receiving said bearing carrier projections, said notches and said projections being dimensioned relative to each other to provide sufficient clearance therebetween to allow relatively free self-aligning radial movement of said bearing with respect to said clutch input shaft axis, said other race member notches and said bearing carrier projections extending generally radially outwardly to cooperate in a circumferentially interfering relationship with one another in order to substantially prevent the rotation of said other race member with respect to said bearing carrier, said notches and said projections also extending generally radially outwardly to cooperate in an axially interfering relationship with one another in order to substantially restrict relative axial movement thereof and to substantially retain said bearing in an assembled relationship with said bearing carrier.

2. The self-aligning clutch release bearing assembly according to claim 1 wherein said anti-rotation means further includes at least one additional generally radially outwardly extending projection rotationally fixed with said bearing carrier, said additional projection extending sufficiently radially outwardly for a circumferential interfering relationship with said actuating means in order to substantially restrain rotation of said bearing carrier with respect to said actuating means.

3. The self-aligning clutch release bearing assembly according to claim 1 wherein said projections are integrally formed on said bearing carrier.

* * * * *